Patented Nov. 6, 1934

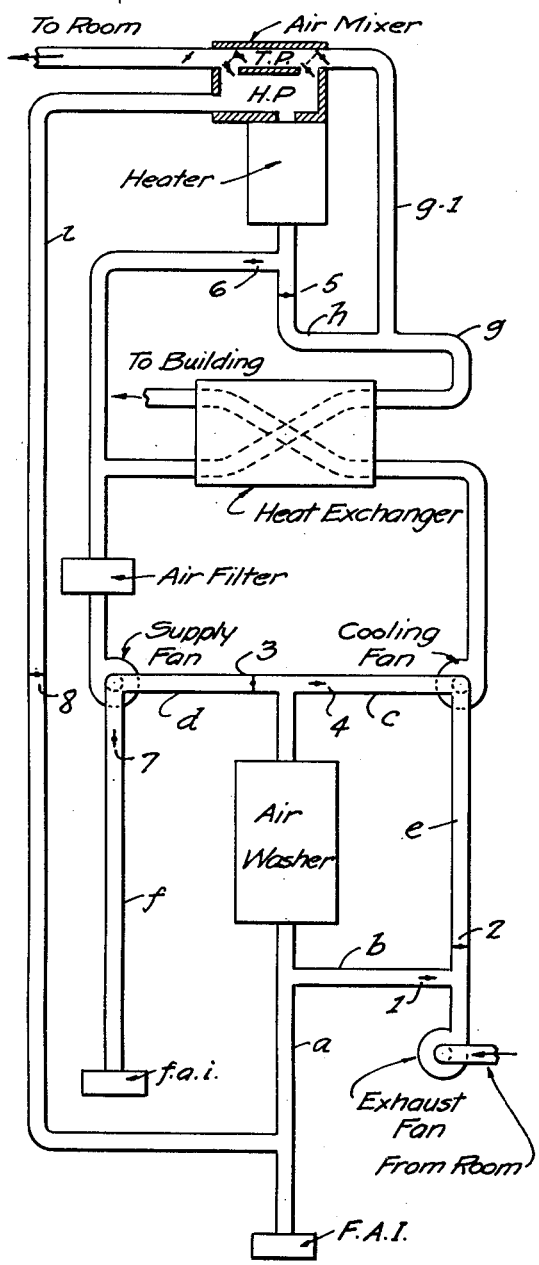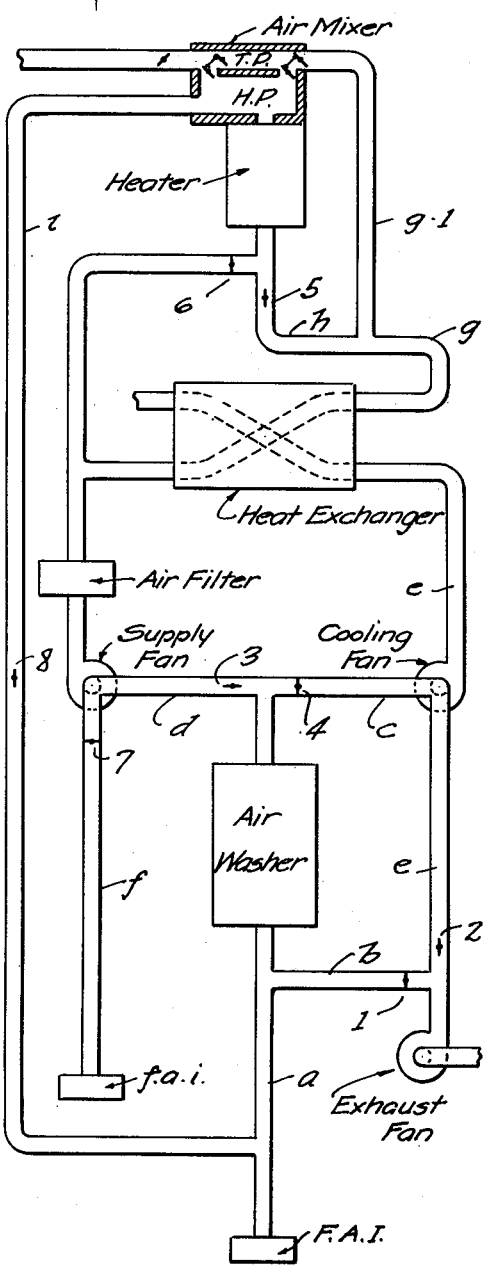

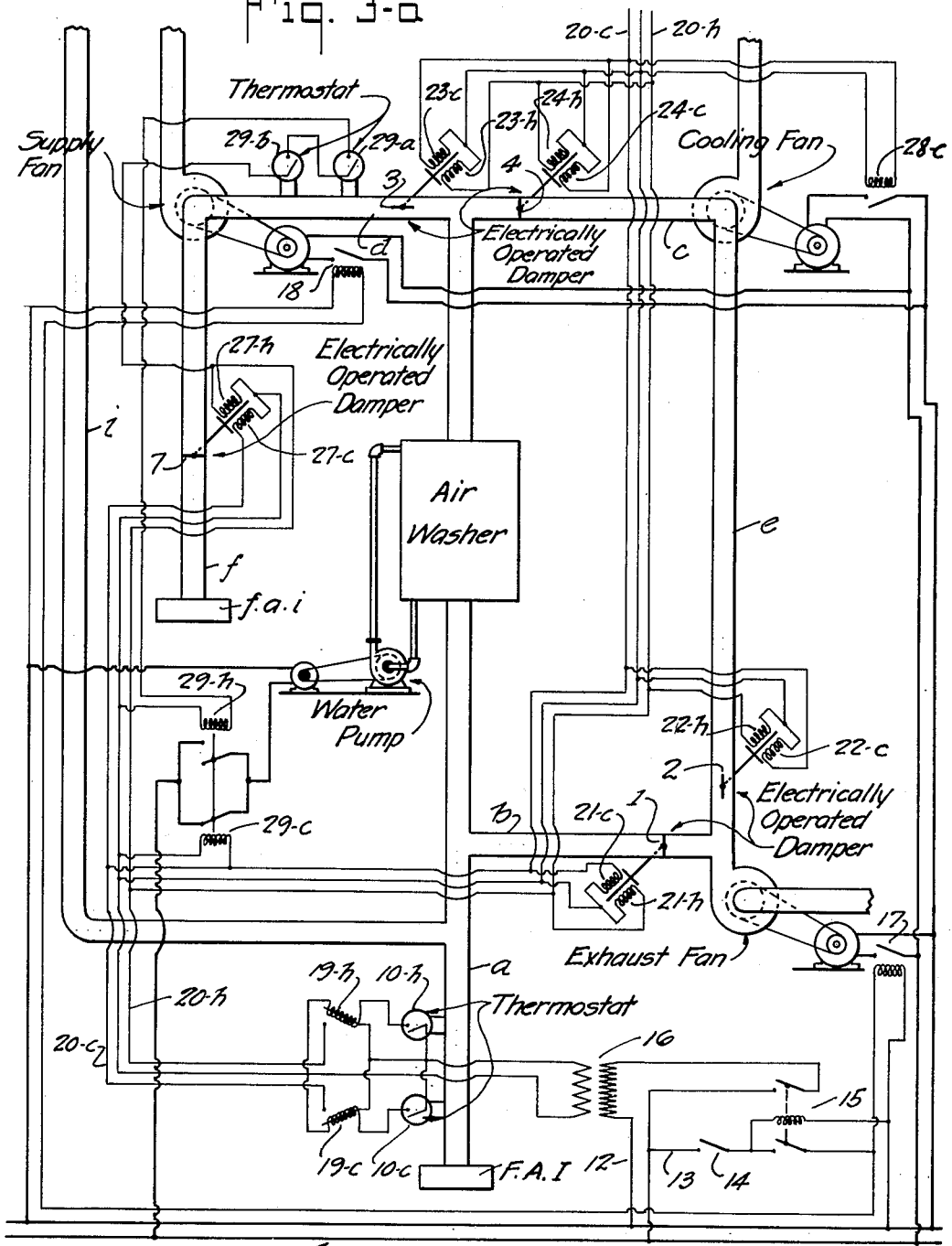

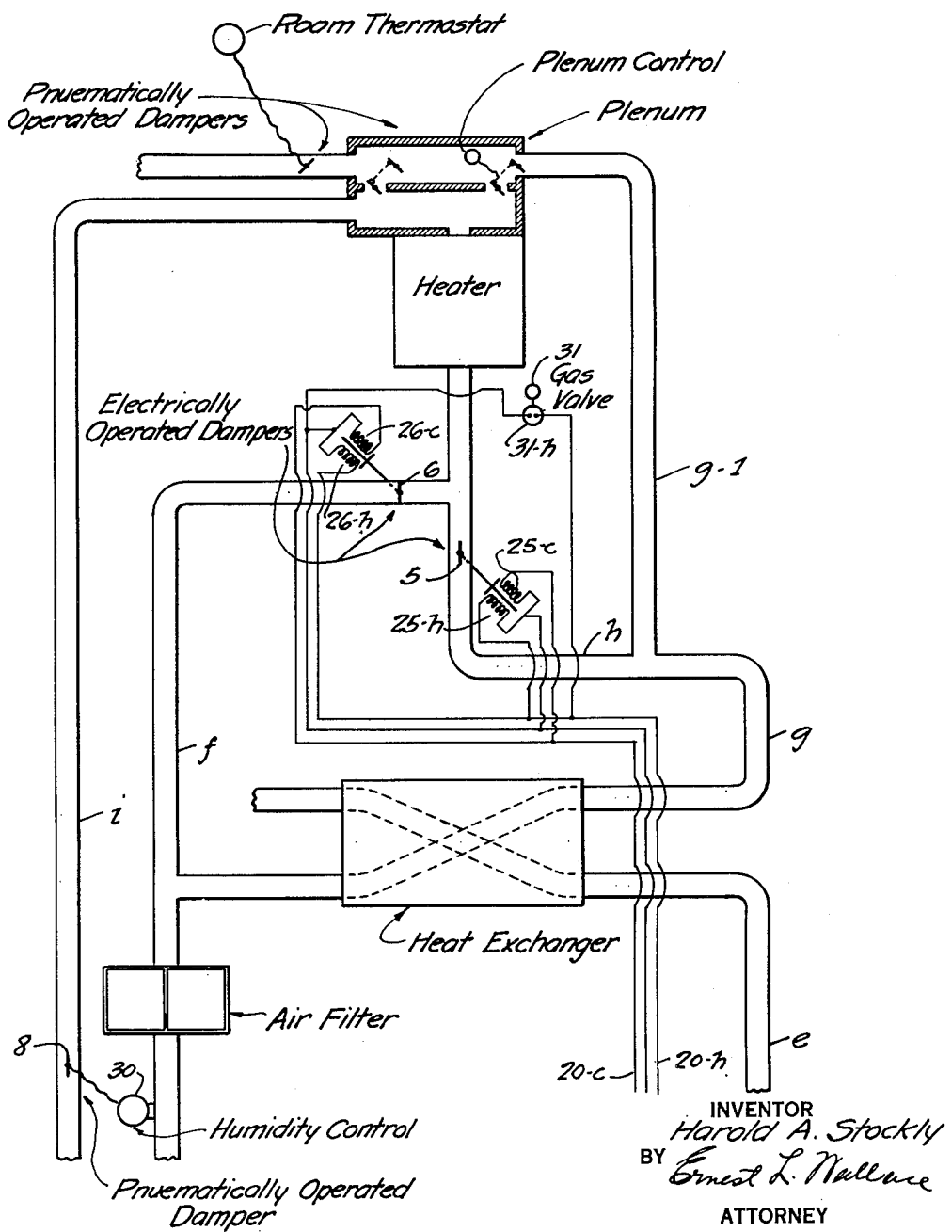

1,980,109

UNITED STATES PATENT OFFICE 1,980,109

AIR CONDITIONING SYSTEM

Harold A. Stockly, Alhambra, Calif.

Application April 1, 1932, Serial No. 602,613

6 Claims. (Cl. 257—8)

This invention relates to an air conditioning system for enclosures such as rooms of a building and its primary object is to transfer thermal values by conduction and convection between a stream of fresh air supplied to an enclosure and a stream of air not supplied to the enclosure, said streams having different temperatures and moisture content whereby the moisture content of the stream of fresh air may be controlled. Another object of this invention is to use the residual thermal values of the spent air from an enclosure without recirculation of the spent air through the enclosure. A further object is to provide an air conditioning system of the character described which will automatically operate either to cool or heat incoming air. In addition to the broader objects of this invention, other objects thereof are to provide a system of the character described having any or all of the following features: maintenance of desirable temperatures in the enclosure by supply of fresh air of a suitable temperature; maintenance of desirable humidity; use of the residual thermal values of the spent air for action upon the incoming fresh air; and enabling further use of the residium of thermal values indirectly upon the enclosure.

These objects together with other objects and corresponding accomplishments are obtained by means of the embodiment of my invention illustrated in the accompanying drawings, in which:—

Fig. 1 is a schematic diagram of the air circuit for cooling; Fig. 2 is a view similar to Fig. 1 showing the circuit for heating; and Figs. 3a and 3b are schematic diagrams showing the control circuit, Fig. 3b being a fragmental portion of the circuit to be added to the upper end of Fig. 3a to make a complete circuit.

Referring more particularly to Figs. 1 and 2, a fresh air inlet is denoted by F. A. I. Extending from the fresh air inlet to a humidifier is an outside air intake conduit (a). The humidifier may be an air washer of the type wherein air is passed through a water spray. In passing through such a spray, the air is humidified and cooled, as is well known in the art. Connected to conduit (a) is an auxiliary air intake conduit (b), air being supplied thereto when used as a cooling system from the spent air from the rooms or enclosures to be supplied with conditioned air. The outlet conduit from the washer is connected to a cool air branch conduit (c) and a humidified air conduit (d). A heat transfer conduit (e) extends from the conduit (b) to a cooling fan, being connected to conduit (c), and the outlet of the fan forming a continuation of the heat transfer conduit line (e). The continuation of the heat conduit transfer line (e) is connected to a heat exchanger, passing therethrough, and being exhausted through a line which may be connected to the outside, to the attic spaces, floor spaces or wall spaces, so as to further preserve thermal values by lessening heat losses through these spaces or exposed surfaces. The heat exchanger is of the indirect type, the conduit (e) having its passages in the exchanger separate from the passages of the air to be acted upon. The air passing through the heat exchanger by way of the conduit line (e) is a heat agent serving, in the case of the operation of the system for cooling as a heat absorbing medium and in the operation of the system for heating serving as an agent to transfer heat to the air being acted upon. This action will be more apparent as the description proceeds. Another fresh air intake is denoted by f. a. i. In practice this last mentioned fresh air intake may be dispensed with and the fresh air intake conduit (f) connected to the intake F. A. I. The fresh air intake conduit (f) is connected to conduit (d) and to the intake of a supply fan. The fresh air intake line (f) is extended through the supply fan to an air filter and from thence to the heat exchanger being connected to the air treating intake of the heat exchanger. The air treated outlet of the heat exchanger is connected by a conduit (g) to the intake of an air heater by a conduit (h). The outlet of the air heater is connected to an air mixer of a type well known in the art. This air mixer has a hot plenum marked H. P. and a tempered plenum marked T. P. There are air mixing valves which may be controlled by graduate thermostatic means from the rooms whose temperature is to be controlled. A by-pass conduit (g—1) extends from conduit (g) to the tempered plenum. Extending from the air breathing intake of the heat exchanger the conduit (f) is connected to conduit (g) at the intake of the heater. A by-pass conduit (i) extends from the hot plenum to the fresh air intake F. A. I.

A damper (1) is disposed in the auxiliary air intake conduit (b). A damper (2) is disposed in conduit (e) between conduits (b) and (c). A damper (3) is disposed in conduit (d) and a damper (4) in conduit (c). A damper (5) is disposed in conduit (h). A damper (6) is disposed in a conduit line (f) between the air treating intake of the heat exchanger and the intake of the heater. A damper (7) is disposed in conduit line (f) between its intake f. a. i. and conduit (d). Dampers (1) to (7) are electrically operated to be closed by one electrical control circuit and opened by another. In the by-pass conduit (i) is a damper (8) operated by a humidity control.

To operate the air circuit for cooling, the dampers are positioned as shown in Fig. 1. Fresh air may enter through the intake F. A. I. and pass to the air washer. This incoming air will be at the highest temperature of air in the system. Spent air from a room at a lower temperature than the incoming air will pass through conduit (b) to the air washer being mixed with the air passing through conduit (a). In its passage through the air washer the air is cooled by evaporation and passes out of the air washer by way of conduit (c) and the line of conduit (e) to the air agent intake of the heat exchanger and through the latter to the air agent outlet. From thence it may be led to the ouside or to the spaces between the walls, the attic space or spaces beneath the floors as desired. The air whose travel has just been described does not enter the rooms or enclosures, it containing the spent air from the rooms. Its function is merely to preserve thermal values by absorbing heat from the air supplied to the enclosures. In this instance, the air washer acts as an evaporative cooler. Since the air passing through the washer is humidified, it may have a moisture content too great for comfort, if supplied to the room. Separation of the humidified air from the fresh air enables control of the moisture content of the fresh air passing to the room.

The air to be conditioned and supplied to the enclosures passes by way of fresh air intake f. a. i., through the conduit line (f), the air filter, to the air treating intake of the heat exchanger and through the latter. In its passage it gives up some of its heat. The air then passes from the air treated outlet of the heat exchanger by way of conduits (g) and (g—1) to the tempered plenum. Air is also by-passed around the heat exchanger to the intake of the heater, the latter not being in operation and serving merely as a passageway. This by-passed air travels through the heater to the hot plenum. The by-pass conduit (i) is closed by its damper (8).

For the air circuit to act as a heating circuit, the dampers are in a position shown in Fig. 2. Air passes from the rooms by way of conduit line (e) to the air agent intake of the heat exchanger and thence to the outside or the spaces in the walls, in the attic or under the floors as desired. In this instance, the air passing from the rooms will be of such temperature that heat can be transferred to the incoming air for the rooms. The air to be conditioned passes from the fresh air intake F. A. I. by way of conduit (a) through the air washer where it is humidified, by way of conduit (d) and conduit line (f), through the air filter, to the air treating intake of the heat exchanger by way of conduits (g) and (h) to the intake of the heater. The heater is in operation and the air passing through will be heated. Some of the air from the heat exchanger may be by-passed around the heater by way of conduit (g—1). The by-pass conduit (i) may be opened by reason of a low degree of humidity in the conduit line (f). A control for damper (8) is disposed in conduit line (f) between the supply fan and the air filter. In extremely cold weather the incoming air by way of conduit (a) may be of a temperature low enough to freeze the water in the air washer. By recirculating the air from the hot plenum to the conduit (a) the temperature of air passing through the air washer may be raised. The amount of humidity which the outside air can contain varies directly with the air temperature. For this reason, the humidity control for damper (8) will operate the damper in accordance with the temperature in conduit (f).

The system functions automatically as a cooling or heating system depending upon the temperature of the air to be controlled. There is a selected temperature for the rooms and an automatic control may be placed in the exhaust line from the rooms to cause the system to function either as a cooling or heating system. However, another position is in the air intake conduit (a). Referring to Figs. 3a and 3b, this may be effected by two thermostats 10—h and 10—c. The thermostat 10—c closes an electrical control circuit at a high temperature limit and the thermostat 10—h closes an electrical control circuit at a low temperature limit.

A power line 11 serves to supply power for operating the motors and also to supply power for the control circuit. There is a primary circuit 12 connected to the power lines. A line 13 is connected to one side of the power line and has a master switch 14 for placing the system in operation. The line 13 includes the operating coil of a two pole switch 15. The two pole switch 15 is normally open and on closure of the master switch 14 the coil operates switch 15 to close the latter and thereby close the primary circuit 12 and energize the primary winding of step down transformer 16. It also closes a circuit including coils of a normally open starting switch 17 for the exhaust fan motor and a like starting switch 18 for the supply fan motor. Thus, on closure of the master switch 14 both the exhaust fan and the supply fan are started and maintained in operation while the master switch is closed. Closure of the master switch energizes transformer 16 whose secondary has the switches of thermostats 10h and 10c connected in parallel there across. Assuming that the thermostat 10h is closed by reason of a low temperature in the fresh air intake F. A. I., the system will be placed in operation as a heating system. Current will pass from the secondary of transformer 16 through thermostat switch 10h and through a coil 19h to close its switch. Current then passes through a line 20h through a coil 21h to operate damper (1) so as to close the passage of exhaust air through air conduit (b). By a branch circuit, current passes through coil 22h and operates damper (2) to open the latter. By a branch circuit, current passes through a coil 23h to open damper (3). By way of another branch circuit, current passes through a coil 24h to close damper (4) and also through a coil 25h to open damper (5). Current also passes through a coil 26h to close damper (6) and through a coil 27h to close damper (7). The cooling fan is controlled by an electrically operated starting switch in the electrical cooling circuit having a coil 28c not in the electrical heating circuit. The air washer water pump is controlled by a reversing motor starter having a coil 29h for causing closure of its switch. In the conduit (d) there are two humidity controlling thermostats; one of these marked 29a operates to open its switch above a high temperature limit and the other 29b operates to open its switch below a low temperature limit. The switches of 29a and 29b are in series and in circuit with coil 29h. Coil 29h is only energized between a selected high and a selected low temperature. On energization of coil 29h the motor starter switch will be closed and the water pump placed in operation. If the temperature falls too low, the thermostat switch 29b will be opened, and the motor will stop operation, thereby stopping the water pump for the air washer. If the temperature rises too high, thermostat switch 29a will be opened, thereby stopping operation of the water pump. Thus, if the temperature is too low or below the low limit freezing of the water in the air washer might occur, and the air washer pump will be stopped. If the temperature is above the high limit, which would mean that the humidity is too great, the water pump would be stopped so that the incoming air would not be further humidified. The damper (8) is controlled from a humidity control 30 disposed in conduit line (f). The humidity control operates to open the damper (8) when the humidity falls too low, which would result when the air passed through the air washer was at a temperature low enough to be deficient in humidity. When damper (8) is open, air is by-passed from the hot plenum to conduit (a) to increase the temperature of the incoming air by a recirculation. A self closing gas valve 31 for the heater is operated by an electrically operated switch 31h in the control circuit to open the gas valve. Normally, the gas valve 31 is maintained closed. Thus, on thermostat 10h closing its switch at a low temperature limit the dampers (1) to (7) are operated to place the circuit in the condition shown in Fig. 2, the gas valve is opened and the system functions to heat incoming air, to properly humidify it and supply the conditioned air to an enclosure.

If the temperature rises high enough in the air intake conduit (a), switch 19c is closed energizing coil 19c and causing current to pass by way of conductor 20c to the coils 21c, 22c, 23c, 24c, 25c, 26c, 27c, and 29c. It also causes current to pass through the coil 28c of a motor starter switch for the cooling fan and places the latter in operation. The dampers are then disposed in the positions shown in Fig. 1 to operate the air circuit as a cooling circuit. Since the humidity of air affecting the humidity control 30 is high due to the temperature of the incoming air, damper (8) will remain closed and the by-pass line (i) will be inoperative during cooling. The water pump starting switch is caused to close by energization of coil 29c.

Each of the dampers (1) to (7) are conventional electric damper controls having two coils, one for closing the damper and one for opening the damper. The motor starters are of conventional type and it is contemplated using Cutler-Hammer No. 9586 motor starters for the exhaust fan, cooling fan, and supply fan. The motor starter for the water pump may be a Cutler-Hammer No. S. R. B. reversing motor starter. The high and low limit thermostats may be what is known in the trade as Mercoid No. M. 51. The gas valve control may be a Minneapolis-Honeywell valve No. 610 self closing.

What I claim is:—

1. In an air conditioning system for an enclosure, the combination of an humidifier, a heat exchanger having a confined air passage for air to be treated, a heater, an air output member for supplying air to said enclosure, and air transmission means: said air transmission means comprising a network of conduits communicating with said output member for delivering treated air, communicating with a source of fresh air supply, and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said output member, and a segregated line of said conduits conveying air from said auxiliary intake through said exchanger separate from the air in said passage; the air cooling circuit comprising a line of said conduits conveying air from said source through said passage to said output member and a segregated line of said conduits conveying air from said auxiliary air intake through said humidifier and through said exchanger separate from the air in said passage; and means to place said conduits in communication to provide either said air heating circuit or to provide said air cooling circuit.

2. In an air conditioning system for an enclosure, the combination of an humidifier, a heat exchanger having a confined air passage for air to be treated, a heater, an air output member for supplying air to said enclosure, and air transmission means: said air transmission means comprising a network of conduits communicating with said output member for delivering treated air, communicating with a source of fresh air supply, and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said output member, and a segregated line of said conduits conveying air from said auxiliary intake through said exchanger separate from the air in said passage; the air cooling circuit comprising a line of said conduits conveying air from said source through said passage to said output member and a segregated line of said conduits conveying air from said auxiliary air intake through said humidifier and through said exchanger separate from the air in said passage; and thermostatically actuated means located to be responsive to the temperature of air to be controlled and operating at a predetermined low temperature to place said conduits in communication to provide said air heating circuit and operating at a predetermined high temperature to place said conduits in communication to provide said air cooling circuit.

3. In an air conditioning system for an enclosure, the combination of an humidifier, a heat exchanger having a confined air passage for air to be treated, a heater, an air output member for supplying air to said enclosure, and air transmission means; said air transmission means comprising a network of conduits communicating with said output member for delivering treated air, communicating with a source of fresh air supply and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said output member, and a segregated line of said conduits conveying air from said auxiliary intake through said exchanger separate from the air in said passage; the air cooling circuit comprising a line of said conduits conveying air from said source through said passage to said output member and a segregated line of said conduits conveying air separate from the air in said passage through said humidifier and through said exchanger; and means to place said conduits in communication to provide either said air heating circuit or to provide said air cooling circuit.

4. In an air conditioning system for an enclosure, the combination of an humidifier, a heat exchanger having a confined air passage for air to be treated, a heater, an air output member for supplying air to said enclosure, and air transmission means: said air transmission means comprising a network of conduits communicating with said output member for delivering treated air, communicating with a source of fresh air supply, and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said output member, and a segregated line of said conduits conveying air from said auxiliary intake through said exchanger separate from the air in said passage; the air cooling circuit comprising a line of said conduits conveying air from said source through said passage to said output member and a segregated line of said conduits conveying air separate from the air in said passage through said humidifier and through said exchanger; and thermostatically actuated means located to be responsive to the temperature of air to be controlled and operating at a predetermined low temperature to place said conduits in communication to provide said air heating circuit and operating at a predetermined high temperature to place said conduits in communication to provide said air cooling circuit.

5. In an air conditioning system for an enclosure, the combination of an humidifier, a heat exchanger having a confined air passage for air to be treated, a heater, an air mixer having a hot plenum and a tempered plenum for supplying air to said enclosure, and air transmission means: said air transmission means comprising a network of conduits communicating with said mixer for delivering treated air, communicating with a source of fresh air supply, and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said hot plenum, conduit to by-pass air around said heater to said tempered plenum, a segregated line of said conduits conveying air from said auxiliary intake through said exchanger to act as a heat transfer agent; the air cooling circuit comprising a line of said conduits conveying air from said source through said passage to said tempered plenum, conduit to by-pass air around said exchanger to said hot plenum, a segregated line of conduits conveying air separate from the air in said passage through said humidifier and through said exchanger to act as a heat transfer agent; and means to place said conduits in communication either to provide said air heating circuit or to provide said air cooling circuit.

6. In an air conditioning system for an enclosure, the combination of an humidifier, a heat exchanger having a confined air passage for air to be treated, a heater, an air mixer having a hot plenum and a tempered plenum for supplying air to said enclosure, and air transmission means: said air transmission means comprising a network of conduits communicating with said mixer for delivering treated air, communicating with a source of fresh air supply, and provided with an auxiliary intake for spent air from said enclosure, said conduits being communicable to alternatively cause said system to act as an air heating circuit or as an air cooling circuit; the air heating circuit comprising a line of said conduits conveying fresh air from said source through said humidifier, through said passage and through said heater to said hot plenum, conduit to by-pass air around said heater to said tempered plenum, a segregated line of said conduits conveying air from said auxiliary intake through said exchanger to act as a heat transfer agent; the air cooling circuit comprising a line of said conduits conveying air from said source through said passage to said tempered plenum, conduit to by-pass air around said exchanger to said hot plenum, a segregated line of conduits conveying air from said auxiliary air intake through said humidifier and through said exchanger to act as a heat transfer agent; and means to place said conduits in communication either to provide said air heating circuit or to provide said air cooling circuit.

HAROLD A. STOCKLY.